United States Patent [19]
Hettinga

[11] Patent Number: 6,071,461
[45] Date of Patent: *Jun. 6, 2000

[54] METHOD OF MAKING A MULTIPLE-LAYER ARTICLE HAVING A PLASTIC MEMBER WITH A SURFACE APPLICATION MATERIAL EFFECTIVELY BONDED THERETO

[76] Inventor: Siebolt Hettinga, 2123 NW. 111th St., Des Moines, Iowa 50325

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,665

[22] Filed: Aug. 13, 1996

[51] Int. Cl.$^7$ ........................................................ B29B 7/00
[52] U.S. Cl. .................................. 264/328.1; 264/331.15; 264/331.17; 442/42; 442/45; 52/454; 427/403; 427/421
[58] Field of Search .................................. 442/17, 16, 27, 442/41, 42, 43, 45; 52/454; 428/140; 427/403, 421, 428; 264/328.1, 331.15, 331.17

[56] References Cited

U.S. PATENT DOCUMENTS

| 4,068,429 | 1/1978 | Moore | 52/204 |
| 4,284,447 | 8/1981 | Dickens et al. | 52/454 |
| 4,578,915 | 4/1986 | Schneller | 52/454 |
| 4,954,694 | 9/1990 | Mitchell | 52/223 R |
| 5,224,316 | 7/1993 | Fredericks et al. | 52/454 |
| 5,437,823 | 8/1995 | Hettinga . | |

FOREIGN PATENT DOCUMENTS

| 0068784A2 | 5/1983 | European Pat. Off. . |
| 05016271 | 1/1993 | Japan . |
| 2118892 | 11/1983 | United Kingdom . |

*Primary Examiner*—Elizabeth M. Cole
*Attorney, Agent, or Firm*—Brian J. Laurenzo; Michael C. Gilchrist

[57] ABSTRACT

A method of making a multiple-layer article having a surface application material effectively bonded to an injection molded plastic member is provided along with a method for making same. At least a portion of an intermediary substratum is located inside a mold cavity during injection of a plastic injection material where the plastic injection material contacts and becomes partially absorbed into a first side of the intermediary substratum. The plastic member and the intermediary substratum are then removed from the mold cavity, and the surface application material is applied to a second side of the intermediary substratum where the surface application material becomes partially absorbed into the second side of the intermediary substratum.

11 Claims, 4 Drawing Sheets

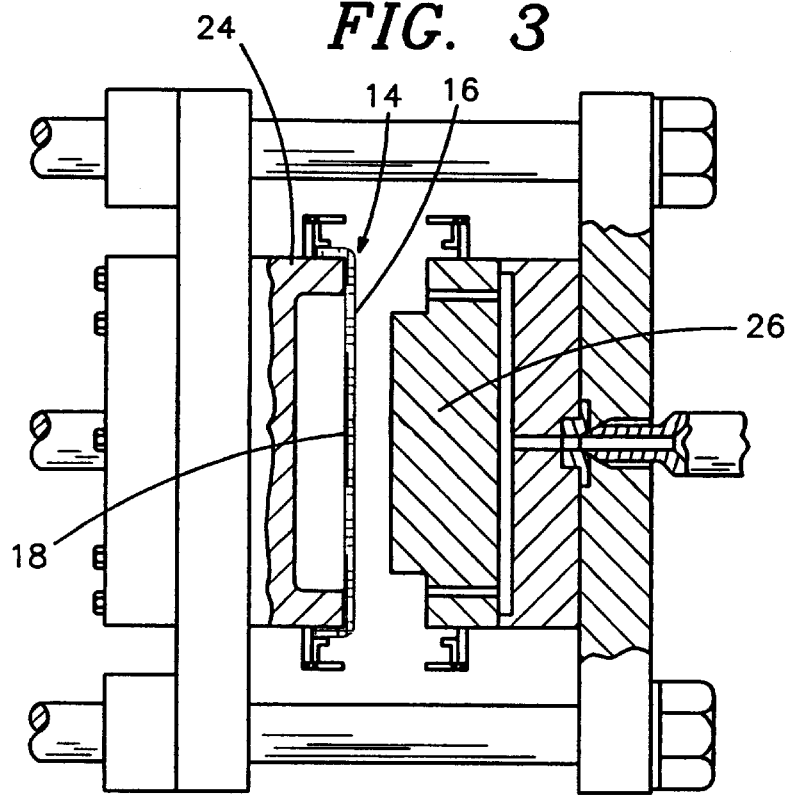
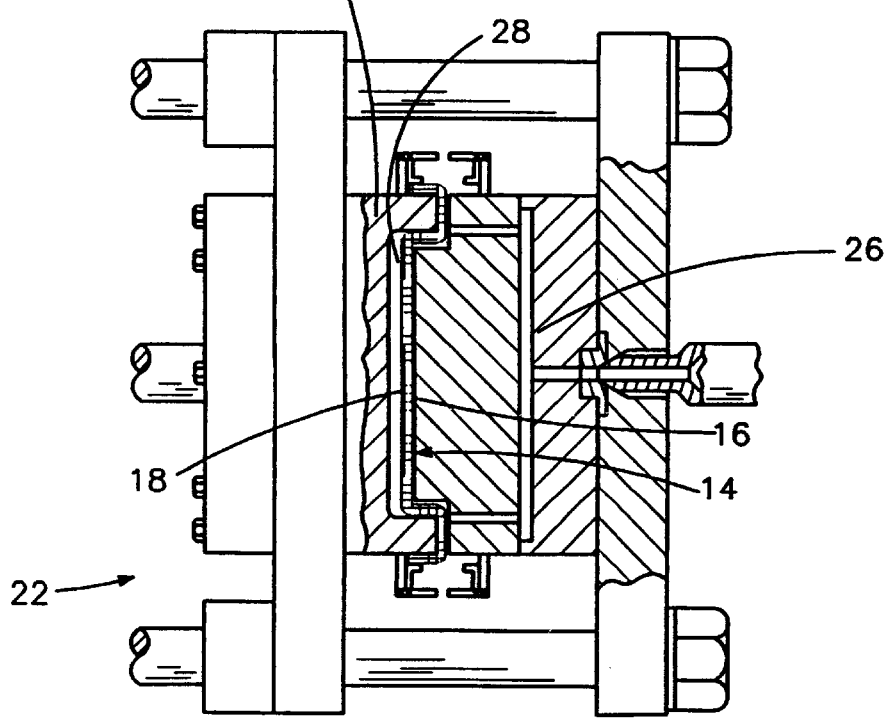

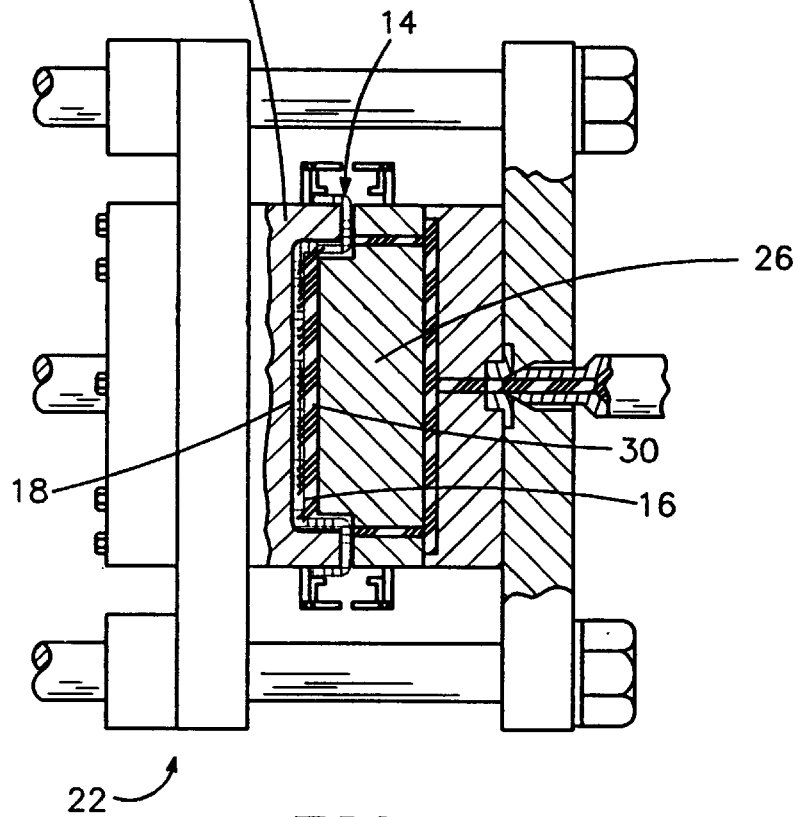
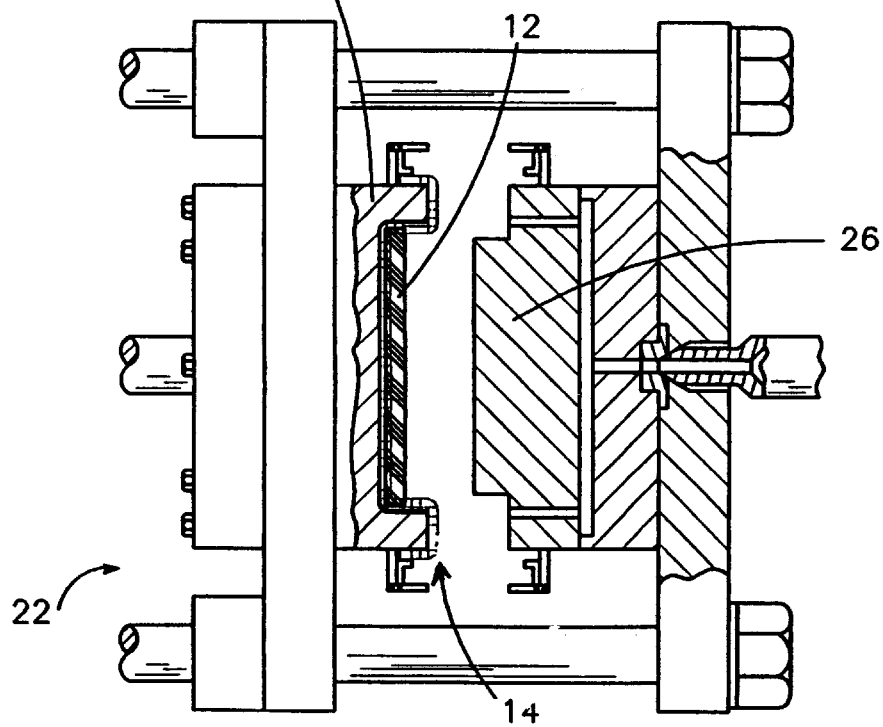

METHOD OF MAKING A MULTIPLE-LAYER ARTICLE HAVING A PLASTIC MEMBER WITH A SURFACE APPLICATION MATERIAL EFFECTIVELY BONDED THERETO

BACKGROUND OF THE INVENTION

The invention relates generally to a multiple-layer article having a surface application material effectively bonded to a plastic member and a method of effectively bonding a surface application material to a plastic member, and more particularly to a multiple-layer article and a method of making same wherein an intermediary substratum is located between a plastic member and a hardened surface application material so that the hardened surface application material is effectively bonded to the plastic member.

Typically, drywall, concrete slabs, plywood and other such materials are used as building components. Of course, a building component such as, for example, a wall of a building, must be able to bear a required load, insulate adequately, and resist moisture effectively. Additionally, a building component typically must be either aesthetically pleasing to the eye, or at least must be capable of being modified so that it is aesthetically pleasing to the eye.

It is possible to manufacture a plastic sheet which is strong, insulating, moisture resistant and weldable by utilizing, for example, the method for molding a plastic article of varied density as described in U.S. Pat. No. 5,437,823. Moreover, adding a surface application material such as stucco, plaster, ceramic, cement, or concrete to a plastic sheet can often further endow the plastic sheet with certain qualities, or can at least enhance certain qualities of the plastic sheet. For example, some types of surface application materials can protect the plastic sheet from bacteria, rot, or even ultra-violet light. Additionally, surface application materials can often make the plastic sheet more flame resistant or can improve the overall aesthetic appearance of the plastic sheet. Therefore, applying a surface application material to a plastic sheet would be desirable in many circumstances.

However, applying a surface application material to a plastic sheet is not typically an easy process. This is true especially if the plastic sheet is comprised of ethylene since ethylene resists adhesion to most surface application materials. Consequently, present methods of adhering most surface application materials to ethylene are costly. Additionally, a very thick coating of surface application material often must be applied in order to accommodate the difference between the rate of expansion of the surface application material and the rate of expansion of the plastic sheet. Obviously, having to provide a very thick coating of surface application material on the plastic sheet results in increased costs and labor. Therefore, it has not been economically feasible to provide a surface application material bonded to a plastic sheet, such as a plastic sheet comprised of ethylene, so that the plastic sheet becomes more ideal for use as a building component.

The difficulties discussed hereinabove are substantially eliminated by the present invention.

SUMMARY OF THE INVENTION

Accordingly, it is an object of the present invention to provide a method of making a multiple-layer article wherein a surface application material is effectively bonded to a plastic member.

Another object of the present invention is to provide a multiple-layer article having a surface application material effectively bonded to a plastic member.

A further object of the present invention is to provide a multiple-layer article having an intermediary substratum so that a surface application material is effectively bonded to a plastic member.

Still another object of the present invention is to provide a plastic member which is not only load bearing, weldable, moisture resistant, and insulating, but can be enhanced with a surface application material in an economically feasible fashion.

Yet another object of the present invention is to provide a multiple-layer article having a surface application material effectively bonded to a plastic member where the surface application material does not crack or break away from the plastic member due to the difference between the rate of expansion of the plastic member and the rate of expansion of the surface application material.

Still a further object of the present invention is to provide a multiple-layer article which includes a relatively thin coating of surface application material which will remain effectively bonded to a plastic member.

Other features and advantages of the present invention will become apparent from a review of the following description, drawings, and claims.

By the present invention, it is proposed to overcome the difficulties encountered heretofore. To this end, a method of making a multiple-layer article having a surface application material effectively bonded to a plastic member is provided, wherein the method comprises: providing a mold unit having a first mold section and a second mold section where the first mold section and the second mold section form a mold cavity upon being clamped together, clamping the first mold section and the second mold section together thereby forming the mold cavity therebetween, providing at least a portion of an intermediary substratum inside the mold cavity where the intermediary substratum has a first side and a second side, injecting a plastic injection material into the mold cavity where the plastic injection material contacts and becomes partially absorbed into at least a portion of the first side of the intermediary substratum, allowing the plastic injection material to at least partially cool in the mold cavity to form a plastic member where the cooling of the plastic material provides a bonding relationship between the first side of the intermediary substratum and the plastic member, removing the plastic member and the intermediary substratum bonded to the plastic member from the mold cavity, applying the surface application material to at least a portion of the second side of the intermediary substratum where the surface application material becomes partially absorbed into the second side of the intermediary substratum, and allowing the surface application material to harden over time where the hardening of the surface application material thereby provides a bonding relationship between the surface application material and the second side of the intermediary substratum.

Additionally, a multiple-layer article is provided where the multiple-layer article comprises: a plastic member, an intermediary substratum having a first side and a second side where a portion of the plastic member is partially absorbed into and is in bonded relationship with at least a portion of the first side of the intermediary substratum, and a hardened surface application material is partially absorbed into and is in bonded relationship with at least a portion of the second side of the intermediary substratum.

BRIEF DESCRIPTION OF THE DRAWINGS

FIG. 3 is a side elevational view of the mold unit of FIG. 2 showing an intermediary substratum secured across a first mold section of the mold unit when the mold unit is in the open position;

FIG. 4 is a side elevational view of the mold unit of FIG. 3 showing the mold unit in a closed position with the intermediary substratum secured across the first mold section of the mold unit;

FIG. 5 is a side elevational view of the mold unit of FIG. 4 showing a plastic injection material injected into a mold cavity while the mold unit is in the closed position and the intermediary substratum is secured across the first mold section of the mold unit;

FIG. 6 is a side elevational view of the mold unit of FIG. 5 showing the mold unit in the open position after the plastic injection material has been allowed to at least partially cool in the mold cavity to form a plastic member thereby forming a bonding relationship between the intermediary substratum and the plastic member;

DETAILED DESCRIPTION OF THE INVENTION

Figure 1:
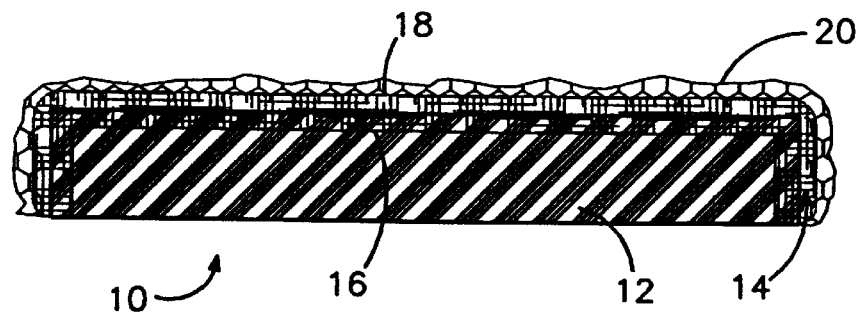
FIG. 1 is an elevational sectional view of a plastic member in accordance with the present invention, said plastic member partially absorbed into and in bonded relationship with a first side of an intermediary substratum, and a hardened surface application material partially absorbed into and in bonded relationship with a second side of the intermediary substratum.

Shown in FIG. 1 is a multiple-layer article 10 including a plastic member 12 comprised of ethylene. While the present invention is, in fact, particularly useful when the plastic member 12 is comprised of ethylene, the plastic member 12 may instead be comprised of essentially any type of plastic. Regardless of which type of plastic is used in order to provide the plastic member 12, preferably the plastic member 12 is strong, insulating, moisture resistant and weldable so that the plastic member 12 is ideal when used as a building component such as a wall. As shown, the plastic member 12 is partially absorbed into and bonded to a first side 16 of an intermediary substratum 14. Preferably, the intermediary substratum 14 is a fabric such as woven fabric, needle-punched fabric, or a heavy spun fabric. However, the intermediary substratum 14 may be another type of fabric or may even be a non-fabric such as metal. A hardened surface application material 20 is partially absorbed into and bonded to a second side 18 of the intermediary substratum 14. Preferably, the hardened surface application material 20 is stucco; however, the hardened surface application material 20 may be plaster, ceramic, cement, concrete or any other hardened surface material. Ideally, the hardened surface material 20 further endows the plastic member 12 and therefore, the multiple-layer article 10 as a whole, with additional qualities, or at least enhances certain qualities of the plastic member 12 so that the multiple-layer article 10 becomes even more ideal for use as a building component. For example, some types of surface application materials can protect plastic from bacteria, rot, or ultra-violet light. Additionally, the surface application material may make plastic more flame resistant or may improve the overall aesthetic appearance of the plastic member.

While providing a surface application material 20 on a plastic member 12 such as on ethylene is often desirable, there has not been an easy and inexpensive process, other than the present invention, of applying a surface application material to some plastics. This is because some plastics such as ethylene resist adhesion to most surface application materials. Additionally, a very thick coating of surface application material often must be applied to the plastic in order to accommodate the difference between the rate of expansion of the surface application material and the rate of expansion of the plastic.

However, the multiple-layer article 10 in FIG. 1 includes an intermediary substratum 14 between the plastic member 12 and the surface application material 20. As mentioned, the plastic member 12 is partially absorbed into and bonded to the first side 16 of the intermediary substratum 14, and the hardened surface application material 20 is partially absorbed into and bonded to the second side 18 of the intermediary substratum 14. In this manner, the intermediary substratum 14 allows the surface application material 20 to be effectively bonded to the plastic member 12. While the rate of expansion of the plastic member 12 in response to, for example, heat, is typically dramatically different from the rate of expansion of the surface application material 20, the intermediary substratum 14 essentially accommodates this difference. As a result, the surface application material 20 does not crack or break away from the plastic member 12 even though the multiple-layer article 10 may be subjected to heat. Additionally, the surface application material 20 need not be very thick in order to remain bonded to the intermediary substratum 14, and therefore effectively bonded to the plastic member 12.

Figure 2:
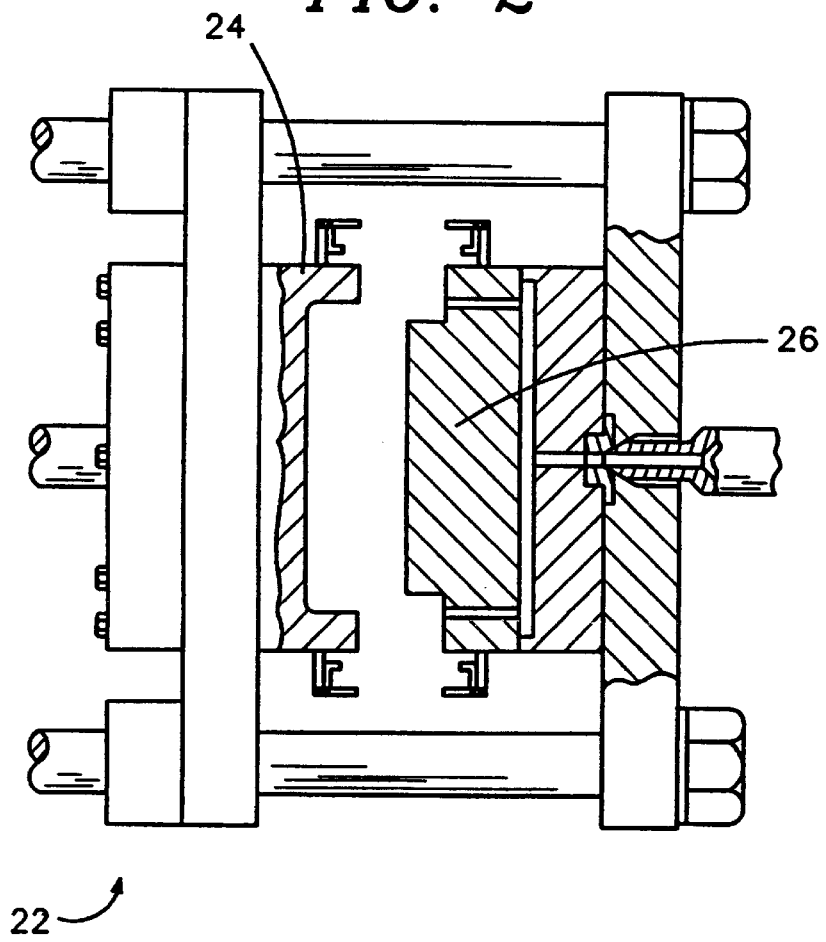
FIG. 2 is a side elevational view of a mold unit in accordance with the present invention, said mold unit in an open position.

The following described method may be utilized to produce the multiple-layer article 10 in FIG. 1. As shown in FIG. 2, a mold unit 22 may be provided where the mold unit 22 has a first mold section 24 and a second mold section 26. As shown in FIG. 4, the first mold section 24 and the second mold section 26 form a mold cavity 28 upon being clamped together. However, before clamping together the first mold section 24 and the second mold section 26 to form the mold cavity 28, preferably the intermediary substratum 14 is secured across the first mold section 24 so that the first side 16 of the intermediary substratum 14 faces the second mold section 26 as shown in FIG. 3. As mentioned, preferably the intermediary substratum 14 is a fabric such as woven fabric, needle-punched fabric, or a heavy spun fabric. After the intermediary substratum 14 is secured across the first mold section 24 as shown in FIG. 3, the first mold section 24 is clamped together with the second mold section 26 to form the mold cavity 28 therebetween as shown in FIG. 4. As a result of the clamping together of the first mold section 24 with the second mold section 26, the intermediary substratum 14 extends across the mold cavity 28. Of course, in order to provide that the intermediary substratum 14 extends across the mold cavity 28 upon the first mold section 24 and the second mold section 26 being clamped together, it is possible to utilize other available methods. For example, the intermediary substratum 14 may be secured across the second mold section 26 instead of the first mold section 24.

Figure 7:
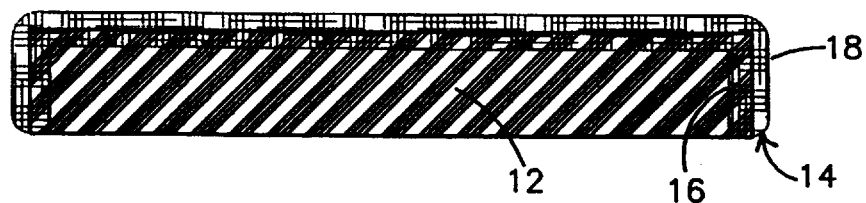
FIG. 7 is an elevational sectional view of the plastic member and the intermediary substratum after they have been removed from the mold unit of FIG. 6.

As shown in FIG. 5, after the first mold section 24 and the second mold section 26 are clamped together to form the mold cavity 28 therebetween, a plastic injection material 30 such as an ethylene-based plastic injection material 30 is injected into the mold cavity 28. As a result of the injection, the plastic injection material 30 contacts and becomes partially absorbed into the first side 16 of the intermediary substratum 14. Thereafter, the plastic injection material 30 is allowed to at least partially cool in the mold cavity 28 to form the plastic member 12, and the cooling of the plastic injection material 30 provides a bonding relationship between the first side 16 of the intermediary substratum 14 and the plastic member 12. Then, the mold cavity 28 is opened by moving apart the first mold section 24 and the second mold section 26 as shown in FIG. 6. After the mold cavity 28 is opened, the plastic member 12 and intermediary substratum 14 are removed from the mold unit 22, and the plastic member 12 and intermediary substratum 14 appear as shown in FIG. 7.

Figure 8A:
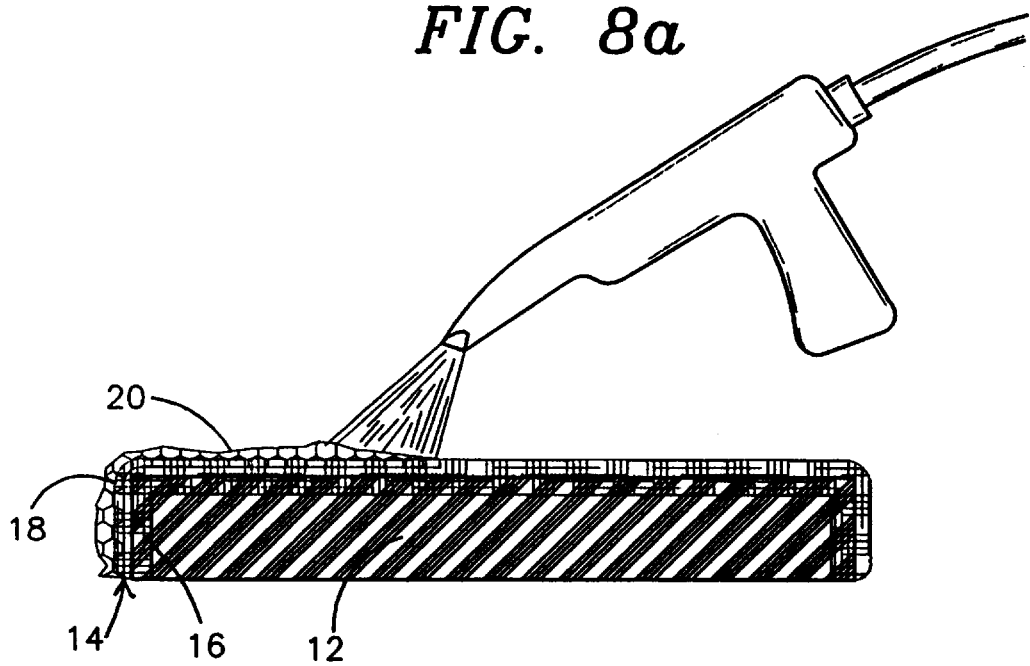
FIG. 8a is an elevational sectional view of the plastic member and the intermediary substratum after they have been removed from the mold unit of FIG. 6 showing spraying of a surface application material onto the intermediary substratum.
Figure 8B:
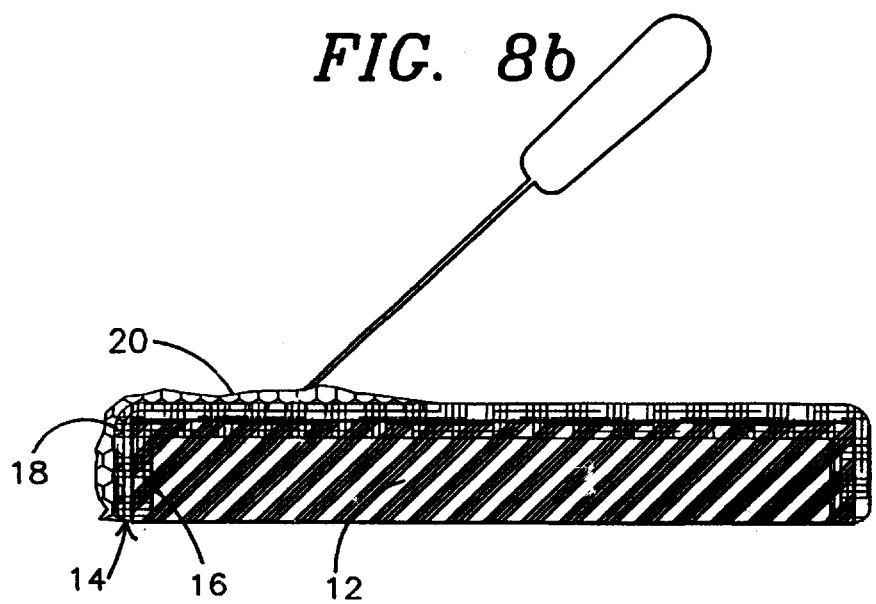
FIG. 8b is an alternative elevational sectional view of the plastic member and the intermediary substratum after they have been removed from the mold unit of FIG. 6 showing hand troweling of a surface application material onto the intermediary substratum.

Finally, the surface application material 20 is applied onto the second side 18 of the intermediary substratum 14. Preferably, the surface application material 20 is stucco and is applied by spraying it onto the second side 18 of the intermediary substratum 14 as shown in FIG. 8a. Alternatively, the surface application material 20 can be hand troweled onto the second side 18 of the intermediary substratum 14 as shown in FIG. 8b, or a combination of spraying and hand troweling can be utilized. One skilled in art would undoubtedly recognize still other effective methods of applying the surface application material 20 to the second side 18 of the intermediary substratum 14. Regardless of which method of applying the surface application material 20 is chosen, preferably the surface application material 20 becomes partially absorbed into the second side 18 of the intermediary substratum 14. After the surface application material 20 is allowed to substantially harden over time, the hardening provides a bonding relationship between the surface application material 20 and the second side 18 of the intermediary substratum 14 to provide the multiple-layer article 10 as shown in FIG. 1.

Because the surface application material 20 need not be very thick in order to remain effectively bonded to the plastic member 12, it is anticipated that the multiple-layer article 10 can be initially provided without the surface application material 20, and the surface application material 20 can be added at the construction site. In other words, it is anticipated that a plastic member 12 bonded to an intermediary substratum 14, such as is shown in FIG. 7, be supplied to a construction worker at a construction site. While at the construction site, the construction worker can apply the desired surface application material 20 to the intermediary substratum 14 in order to provide the resulting multiple-layer article 10 as shown in FIG. 1 which is then ideal to use as a building component.

As described above, the multiple-layer article 10 in FIG. 1 includes an intermediary substratum 14 between the plastic member 12 and the surface application material 20. As mentioned, the plastic member 12 is partially absorbed into and bonded to the first side 16 of the intermediary substratum 14, and the hardened surface application material 20 is partially absorbed into and bonded to the second side 18 of the intermediary substratum 14. In this manner, the intermediary substratum 14 allows the surface application material 20 to be effectively bonded to the plastic member 12. While the rate of expansion of the plastic member 12 is typically quite different from the rate of expansion of the surface application material 20, the intermediary substratum 14 essentially accommodates this difference. Consequently, the surface application material 20 does not crack or break away from the plastic member 12 even though the multiple-layer article 10 may be subjected to heat such that the plastic member 12 expands. Additionally, the intermediary substratum 14 allows the surface application material 20 to be thinly applied, yet remain bonded to the intermediary substratum 14 when the plastic member 12 expands.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, it is anticipated that the mold unit 22 may vary considerably from that which is disclosed and depicted herein, it is anticipated that the intermediary substratum 14 may merely be placed in the mold cavity 28 before the mold sections are clamped together rather than be secured to either mold section, and it is anticipated that the apparatus and method described herein would be useful for applications other than for providing building components.

What is claimed is:

1. A method of effectively bonding a surface application material to an injection molded plastic member, said method comprising:

a) providing an injection molding unit having a first mold section and a second mold section, said first mold section and said second mold section forming a mold cavity upon being clamped together;

b) clamping said first mold section and said second mold section together thereby forming said mold cavity therebetween;

c) providing at least a portion of an intermediary substratum inside said mold cavity, said intermediary substratum having a first side and a second side;

d) injecting a plastic injection material into said mold cavity, said plastic injection material contacting and becoming partially absorbed into at least a portion of said first side of said intermediary substratum upon said plastic injection material being injected into said mold cavity;

e) allowing said plastic injection material to at least partially cool in said mold cavity to form said plastic member, said cooling of said plastic injection material providing a bonding relationship between said first side of said intermediary substratum and said plastic member;

f) removing said plastic member and said intermediary substratum bonded to said plastic member from said mold cavity;

g) applying said surface application material to at least a portion of said second side of said intermediary substratum such that said intermediary substratum is located generally between said surface application material and said plastic member, said surface application material becoming partially absorbed into said portion of said second side of said intermediary substratum; and h) allowing said surface application material to harden over time, said hardening of said surface application material over time thereby providing a bonding relationship between said surface application material and said second side of said intermediary substratum.

2. The method according to claim 1, wherein said plastic member has a first rate of expansion and said surface application material has a second rate of expansion different from said first rate of expansion, wherein upon the hardening of said surface application material said intermediary substratum stabilizes said surface application material by accommodating both said first rate of expansion and said second rate of expansion.

3. The method according to claim 1, wherein said surface application material is a surface application material selected from the group consisting of stucco, plaster, ceramic, cement, and concrete.

4. The method according to claim 1, wherein said plastic material comprises ethylene.

5. The method according to claim 1, wherein said intermediary substratum comprises woven fabric.

6. The method according to claim 1, wherein said intermediary substratum comprises needle punched fabric.

7. The method according to claim 1, wherein said intermediary substratum comprises a heavy spun fabric.

8. The method according to claim 1, wherein the step of applying said surface application material comprises spraying said surface application material onto said intermediary substratum.

9. The method according to claim 1, wherein the step of applying said surface application material comprises hand troweling said surface application material onto said intermediary substratum.

10. The method according to claim 1, wherein the step of applying said surface application material comprises spraying and hand troweling said surface application material onto said intermediary substratum.

11. A method of effectively bonding a stucco material to an injection molded plastic member, said method comprising:

a) providing an injection molding unit having a first mold section and a second mold section, said first mold section and said second mold section forming a mold cavity upon being clamped together;

b) providing an intermediary fabric substratum having a first side and a second side;

c) securing said intermediary fabric substratum across said first mold section so that said first side of said intermediary fabric substratum faces said second mold section;

d) clamping said first mold section and said second mold section together thereby forming said mold cavity therebetween, said clamping resulting in at least a portion of said intermediary fabric substratum extending across said mold cavity;

e) injecting an ethylene-based plastic injection material into said mold cavity, said plastic injection material contacting and becoming partially absorbed into at least a portion of said first side of said intermediary fabric substratum upon said plastic injection material being injected into said mold cavity;

f) allowing said plastic injection material to at least partially cool in said mold cavity to form said injection molded plastic member, said cooling of said plastic injection material providing a bonding relationship between said first side of said intermediary fabric substratum and said injection molded plastic member;

g) removing said injection molded plastic member and said intermediary fabric substratum bonded to said injection molded plastic member from said mold cavity;

h) spraying said stucco material onto at least a portion of said second side of said intermediary fabric substratum such that said intermediary fabric substratum is located generally between said stucco material and said injection molded plastic member, said stucco material becoming partially absorbed into said portion of said second side of said intermediary fabric substratum; and i) allowing said stucco material to harden over time, said hardening of said stucco material over time thereby providing a bonding relationship between said stucco material and said second side of said intermediary fabric substratum.

* * * * *